(12) United States Patent
Iwakura et al.

(10) Patent No.: US 7,262,940 B2
(45) Date of Patent: Aug. 28, 2007

(54) SEPARATE READ/WRITE MAGNETIC HEAD

(75) Inventors: Tadayuki Iwakura, Odawara (JP); Youji Maruyama, Iruma (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 533 days.

(21) Appl. No.: 10/778,909

(22) Filed: Feb. 12, 2004

(65) Prior Publication Data
US 2004/0228041 A1 Nov. 18, 2004

(30) Foreign Application Priority Data
Feb. 17, 2003 (JP) ............................. 2003-037680

(51) Int. Cl.
*G11B 5/39* (2006.01)
(52) U.S. Cl. ...................................... 360/317
(58) Field of Classification Search ..................... None
See application file for complete search history.

(56) References Cited

U.S. PATENT DOCUMENTS

| | | | |
|---|---|---|---|
| 5,701,221 A | 12/1997 | Taniyama et al. | |
| 6,125,009 A * | 9/2000 | Ishiwata et al. | 360/317 |
| 6,154,345 A * | 11/2000 | Ishiwata et al. | 360/317 |
| 6,362,940 B1 * | 3/2002 | Yoda et al. | 360/317 |
| 6,366,428 B1 * | 4/2002 | Yamanaka et al. | 360/126 |
| 6,396,670 B1 | 5/2002 | Murdock | |
| 6,414,818 B1 | 7/2002 | Tanimoto et al. | |
| 6,466,416 B1 * | 10/2002 | Honjo et al. | 360/317 |
| 6,687,082 B1 * | 2/2004 | Ishiwata et al. | 360/126 |

* cited by examiner

*Primary Examiner*—Hoa T. Nguyen
*Assistant Examiner*—Mark Blouin
(74) *Attorney, Agent, or Firm*—Townsend and Townsend and Crew LLP

(57) ABSTRACT

A separate read/write magnetic head of the present invention includes a magnetoresistive head 11 having a magnetoresistive film 25 disposed between a lower shield 23 and an upper shield 28, both of which are formed on a substrate 21, and a pair of electrodes 26 electrically connected to the magnetoresistive film 25; and an inductive magnetic thin film head 12 having a coil 33 between a lower pole piece 31 and an upper pole piece 35, both of which are disposed on the upper shield 28 of the magnetoresistive head 11 with a separation film 29 being sandwiched therebetween, and through a magnetic gap film 32 and an interlayer insulating film 34. Reduced protrusion of the read head element toward the air bearing surface due to heat deformation caused by changes in ambient temperature can be achieved by configuring the lower shield 23 and the upper shield 28 so that the sum of their thicknesses is 0.4 µm or more and less than 3.4 µm.

5 Claims, 5 Drawing Sheets

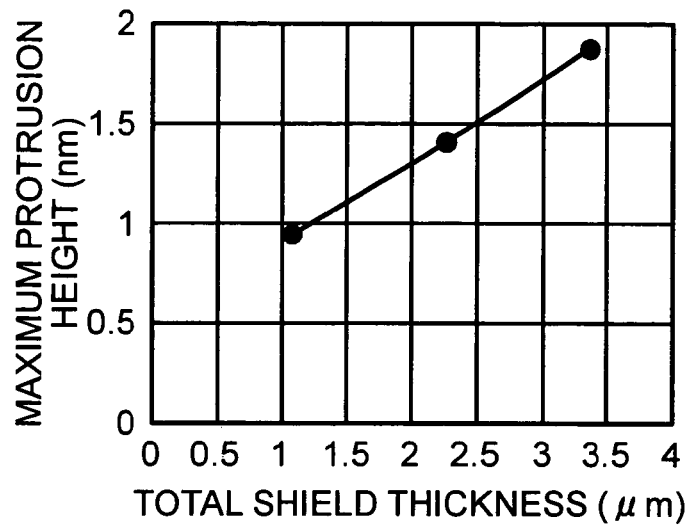
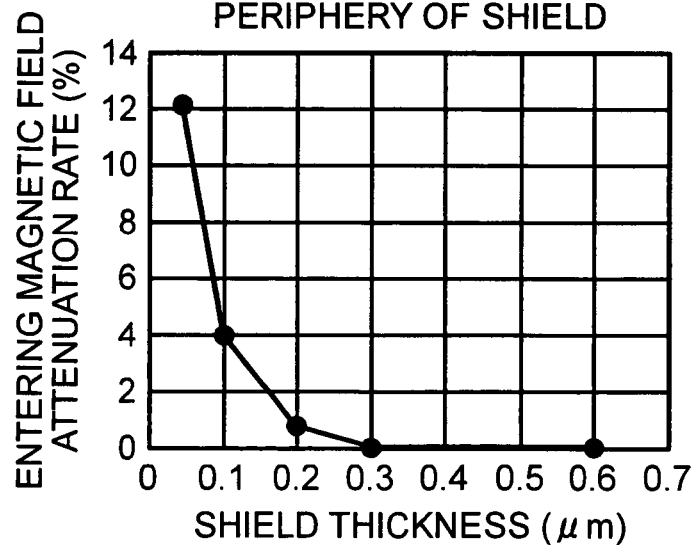

FIG.6
(a)
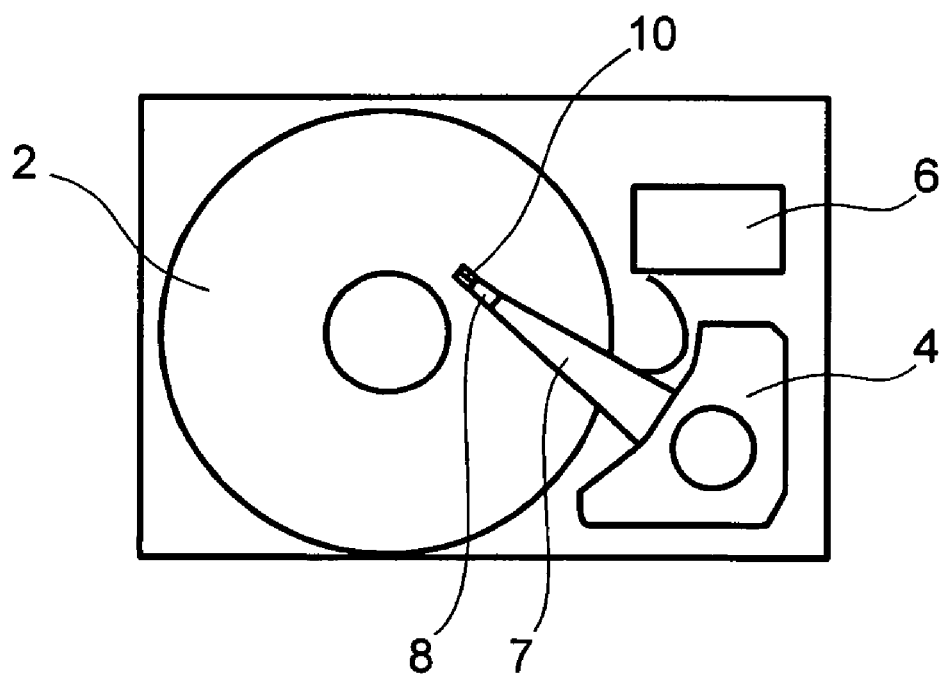
(b)
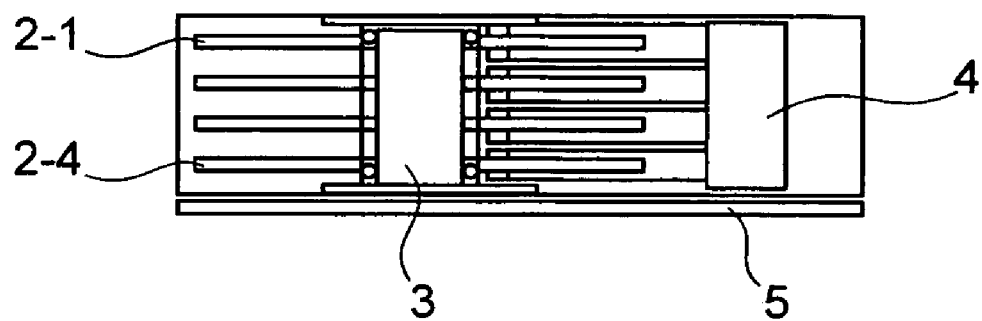

SECTIONAL VIEW OF SEPARATE READ/WRITE MAGNETIC HEAD
(UPPER SHIELD/LOWER POLE SEPARATION TYPE)

SEPARATE READ/WRITE MAGNETIC HEAD

CROSS-REFERENCE TO RELATED APPLICATION

This application claims priority from Japanese Patent Application No. 2003-037680, filed Feb. 17, 2003, the entire disclosure of which is incorporated by reference for all purposes.

BACKGROUND OF THE INVENTION

The present invention relates to a separate read/write magnetic head for use in a magnetic disk device.

In order to meet the demand for greater capacity in magnetic disk devices, recording density has been increased over the years. There has also been a demand for smaller and high-speed magnetic disk devices. In order to satisfy the demands, a GMR (Giant Magnetoresistive) film is used in currently available magnetic disk devices as a magnetoresistive film of a separate read/write magnetic head, so that the recording track width is reduced to 0.4 µm and a gap (hereinafter referred to as flying height) between the magnetic head and a recording medium is reduced to about 15 nm.

The reduction in flying height of the head is essential for the achievement of high-density recording. However, the reduction in flying height may entail a problem of deformation of the head. Since the thin film magnetic head element is constituted of a plurality of components that differ from each other in thermodynamic property such as a coefficient of linear expansion, the head element is subjected to heat deformation that is caused by changes in ambient temperature. A partial protrusion is generated on the air bearing surface of the thin film magnetic head that faces the recording medium due to heat deformation, and the protrusion may make contact with the recording medium and therefore damage the magnetic head element.

FIG. 7 illustrates the configuration of a conventional separate read/write magnetic head 1 wherein an upper shield and a lower pole piece is separated from each other by a separation film that is an insulator. A GMR read head 2 has an upper shield 28 and a lower shield film 23 for eliminating magnetic fields brought by signals other than a desired signal, a GMR film 25 for detecting the desired signal, electrodes 26 for feeding a current to the GMR film 25, an upper gap film 27, a lower gap film 24, and the like. An inductive thin film magnetic write head 3 has a lower pole piece 31 and an upper pole piece 35 for generating a recording magnetic field, a magnetic gap film 32, coils 33 for applying a signal current, an interlayer insulating film 34, and the like. These films constituting the head 1 are formed on an insulating film 22 that is laminated on a substrate 21. Further, the overall head element is covered with a protecting film 36.

Japanese Patent Laid-open No. 2000-306215 (pages 4 to 6, and FIGS. 1 to 3 and 6) discloses a method of preventing an air bearing surface from being deformed during operation by forming at least an upper insulating layer (insulating interlayer) of an inductive magnetic thin film head from a resin having a low glass transition point of 70 to 100° C., a porous material, and polyimide to reduce heat deformation when high humidity is present or by polishing the air bearing surface of the head at a temperature as high as that generated during operation.

SUMMARY OF THE INVENTION

The present invention provides techniques and structures for reducing the protrusion of the read head element above the air bearing surface that is generated by heat deformation due to changes in ambient temperature in a separate read/write magnetic head.

The present inventors have discovered that heat deformation on an air bearing surface of the separate read/write magnetic head is the most prominent on the lower shield 23 and the upper shield 28, and that the influence of the total thickness of the shields is predominant. That is, a portion of the read element between the lower shield 23 and the upper shield 28 protrudes to the air bearing surface as indicated at (d) of FIG. 7. The thin film magnetic head element could conceivably be constituted of materials having similar thermodynamic properties in order to solve this problem, however, such materials are not readily available. Accordingly, the inventors have found preferred heat deformation reducing approaches oriented to the structure of the thin film magnetic head, including preferred arrangement and dimensions of the individual components.

A separate read/write magnetic head according to one aspect of the present invention includes a magnetoresistive head having a magnetoresistive film disposed between a lower shield and an upper shield, both of which are formed on a substrate, and a pair of electrodes electrically connected to the magnetoresistive film; and an inductive magnetic thin film head having a coil between a lower pole piece and an upper pole piece, both of which are disposed on the upper shield of the magnetoresistive head with an insulating film being sandwiched therebetween, and through a magnetic gap film and an interlayer insulating film, wherein a sum of a thickness of the lower shield and a thickness of the upper shield is 0.4 µm or more and less than 3.4 µm.

A separate read/write magnetic head according to another aspect of the present invention includes a magnetoresistive head having a magnetoresistive film disposed between a lower shield and an upper shield, both of which are formed on a substrate, and a pair of electrodes electrically connected to the magnetoresistive film; and an inductive magnetic thin film head having a coil between a lower pole piece and an upper pole piece, both of which are disposed on the upper shield of the magnetoresistive head with an insulating film being sandwiched therebetween, and through a gap film and an interlayer insulating film, wherein a sum of a thickness of the lower shield and a thickness of the upper shield is 0.4 µm or more and less than a thickness of the lower pole piece. In some embodiments, the sum of the thickness of the lower shield and the thickness of the upper shield is less than 1.5 µm.

A separate read/write magnetic head according to another aspect of the present invention includes a magnetoresistive head having a magnetoresistive film disposed between a lower shield and an upper shield, both of which are formed on a substrate, and a pair of electrodes electrically connected to the magnetoresistive film; and an inductive magnetic thin film head having a coil between a lower pole piece and an upper pole piece, both of which are disposed on the upper shield of the magnetoresistive head with an insulating film being sandwiched therebetween, and through a gap film and an interlayer insulating film, wherein a thickness of each of the lower shield and the upper shield is 0.2 µm or more and less than a thickness of the lower pole piece. In some embodiments, the thickness of each of the lower shield and the upper shield is less than 2.0 µm.

A further understanding of the nature and advantages of the present invention may be realized by reference to the remaining portions of the specification and the drawings.

BRIEF DESCRIPTION OF THE DRAWINGS

FIG. 2 is a graph showing the heights of air bearing surface heat deformation protrusions caused by changes in ambient temperature of the separate read/write magnetic head;

FIG. 3 is a graph showing entering magnetic field attenuation rate on the outer periphery of each of shields of the separate read/write magnetic head;

FIG. 6, including FIGS. 6(a) and 6(b), illustrates a magnetic disk device that is provided with the separate read/write magnetic head according to an embodiment of the present invention.

DESCRIPTION OF SPECIFIC EMBODIMENTS

Figure 1:
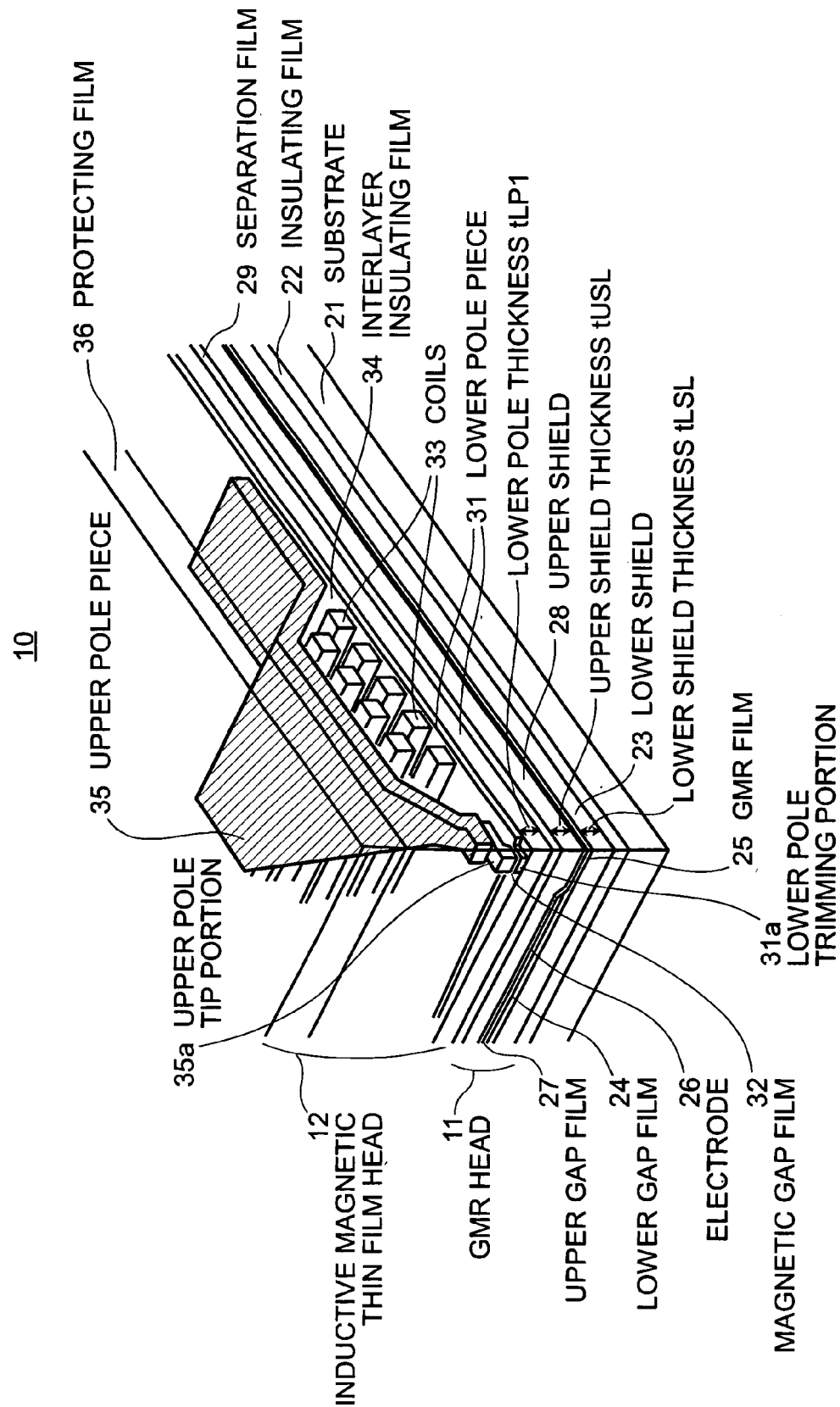
FIG. 1 is a perspective view showing a portion of a section of a separate read/write magnetic head according to one embodiment of the present invention.

FIG. 1 is a partial perspective view showing a section of a separate read/write magnetic head 10 of an upper shield/lower pole separate type and a read/write separate type according to one embodiment of the present invention. A magnetoresistive (GMR) read head 11 has an upper shield 28 and a lower shield film 23 for eliminating magnetic fields brought by signals other than a desired signal, a GMR film 25 for detecting the desired signal, electrodes 26 for feeding a current to the GMR film 25, an upper gap film 27, a lower gap film 24, and the like. An inductive thin film magnetic write head 12 has a lower pole piece 31 and an upper pole piece 35 for generating a recording magnetic field, a magnetic gap film 32, coils 33 for applying a signal current, an interlayer insulating film 34, and the like. The lower pole piece is constituted of a main layer formed from a high magnetic permeable material and an upper layer that is a thin film having a high saturation magnetic flux density, and a trimming portion 31a for defining a recording track width is formed on the air bearing surface side of the upper layer. The lower pole piece 31 may be constituted of a single film, or the upper layer of the lower pole piece 31 may be formed partially, unlike the main layer, in the vicinity of the air bearing surface. An upper pole tip portion 35a for defining the recording track width is formed at a tip of the upper pole piece 35 in such a fashion as to face the trimming portion 31a. The films constituting the head 10 are formed on an insulating film 22 that is laminated on a substrate 21. Further, the overall head element is covered with a protecting film 36.

In this embodiment, a heat deformation reducing means oriented to the structure such as arrangement and dimensions of the components of the thin film magnetic head element is formed such that a sum (total thickness) of a thickness tULS of the upper shield 28 and a thickness tLSL of the lower shield 23 is set to a value less than about 3.4 μm which is a total shield thickness of the present magnetic head. FIG. 2 show the height d of a protrusion generated on the air bearing surface due to heat deformation and located between the lower shield 23 and the upper shield 28. In FIG. 2, the horizontal axis represents the total shield thickness (μm) and the vertical axis represent the maximum height (nm) of the protrusion. As can be seen from FIG. 2, the height d of the protrusion on the air bearing surface due to heat deformation is reduced to half if the total shield thickness is reduced from about 3.4 μm of the present magnetic head to about 1.1 μm.

FIG. 2 indicates that the air bearing surface heat deformation is reduced with the reduction in thickness of the shields. However, if the shield thickness is too small, then the essential functions of the shields, that is, constituting the read gap and reducing the unnecessary magnetic field entering the read element formed between the shield, is impaired.

Shown in FIG. 3 is an attenuation rate of the entering magnetic field in an outer periphery of each of the shields, wherein the horizontal axis represents a thickness of each of the shields and the vertical axis represents an entering magnetic field attenuation rate (%). As can be seen from FIG. 2, the magnetic field entering from the outer periphery of the shield sharply increases when each of the thickness tUSL of the upper shield 28 and the thickness tLSL of the lower shield 23 is less than 0.2 μm. Such sharp increase in magnetic field affects adversely on the read characteristic. Therefore, in order to achieve both of the reduction in air bearing surface heat deformation protrusion and the essential function of the shields, it is necessary that each of the thickness tUSL of the upper shield 28 and the thickness tLSL of the lower shield 23 be set to 0.2 μm or more.

In order to achieve the air bearing surface heat deformation reduction by reducing the shield thickness, it is also necessary to consider the influence of the shields and heat deformation on the overall air bearing surface. The lower pole piece 31 may have a large flat surface similar to those of the shields and subject to air bearing surface heat deformation protrusion similar to that of the shields. In this case, it is difficult to reduce a thickness tLP1 of the lower pole piece 31 to 1.5 to 2.0 μm or less in order to secure the recording magnetic field. In order to reduce the influence of the shields to be exerted on the overall air bearing surface heat deformation and thereby to realize the sufficient effect of the shields of reducing the air bearing surface heat deformation, it is necessary to reduce the thickness of each of the upper shield 28 and the lower shield 23 compared with the thickness tLP1 of the lower pole piece 31. Therefore, in order to achieve the air bearing surface heat deformation reduction effect through the reduction in shield thickness, each of the thickness tUSL of the upper shield 28 and the thickness tLSL of the lower shield 23 must be smaller than the thickness tLP1 (1.5 to 2.0 μm) of the lower pole piece 31.

Figure 4:
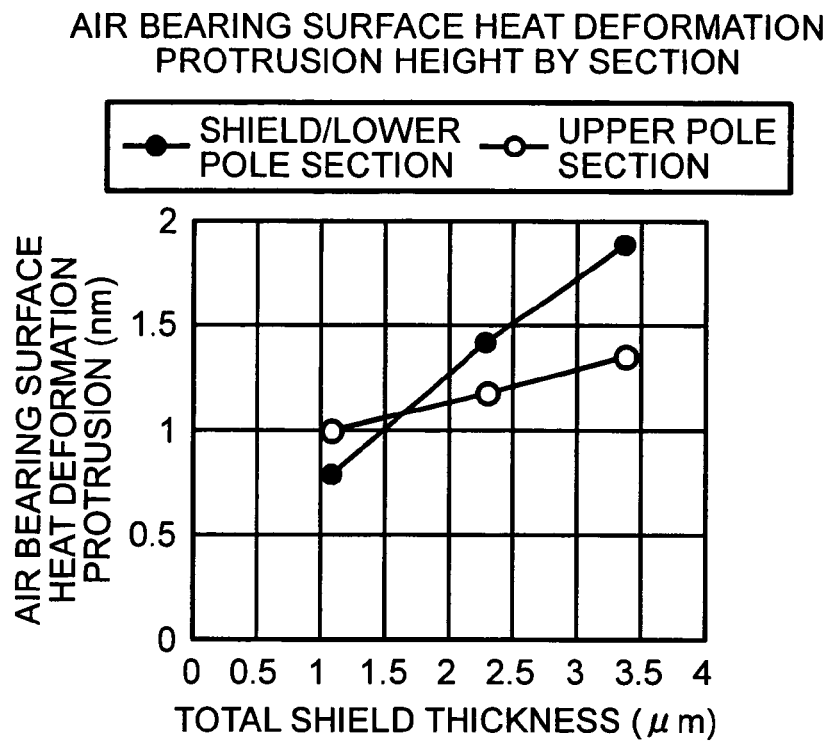
FIG. 4 is a graph showing the height of air bearing surface heat deformation protrusion, by section, caused by changes in ambient temperature of the separate read/write magnetic head.

Meanwhile, with respect to the air bearing surface heat deformation caused by changes in ambient temperature, a portion constituted of the upper shield 28, the lower shield 23, and the lower pole piece 31 and a portion of the upper pole piece 35 tend to protrude. Shown in FIG. 4 is air bearing surface heat deformation protrusion by section obtained by the heat deformation simulations, wherein the horizontal axis represents the total shield thickness (μm) and the vertical axis represents the air bearing surface heat deformation protrusion height (nm). As can be seen from FIG. 4, it is necessary to set the total shield thickness to a value less than 1.5 μm in order to make the protrusion heights of the upper and the lower shield 28 and 23 and the lower pole piece 31 smaller than that of the upper pole piece 35.

The above-described relationships among the respective thicknesses of the upper shield 28, the lower shield 23, and the lower pole pieces 31 for the achievement of the reduction in air bearing surface heat deformation protrusion can be summed up as follows:

$$0.4\ \mu m \leq \text{total thickness}\ (tUSL+tLSL) < 3.4\ \mu m; \quad (1)$$

$$0.4\ \mu m \leq \text{total thickness}\ (tUSL+tLSL) < \text{lower pole piece thickness}\ tLP1; \quad (2)$$

$$0.4\ \mu m \leq \text{total thickness}\ (tUSL+tLSL) < 1.5\ \mu m;\ \text{and} \quad (3)$$

$$0.2\ \mu m \leq \text{upper shield thickness}\ tUSL,\ \text{lower shield thickness}\ tLSL < \text{lower pole piece thickness}\ tLP1. \quad (4)$$

Figure 5:
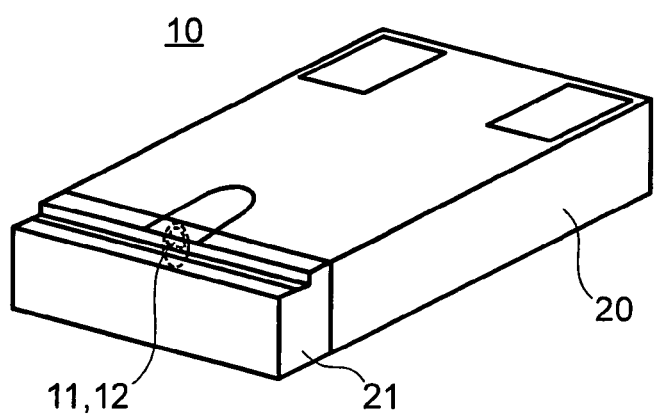
FIG. 5 is a perspective view of the overall separate read/write magnetic head according to an embodiment of the present invention.
Figure 7:
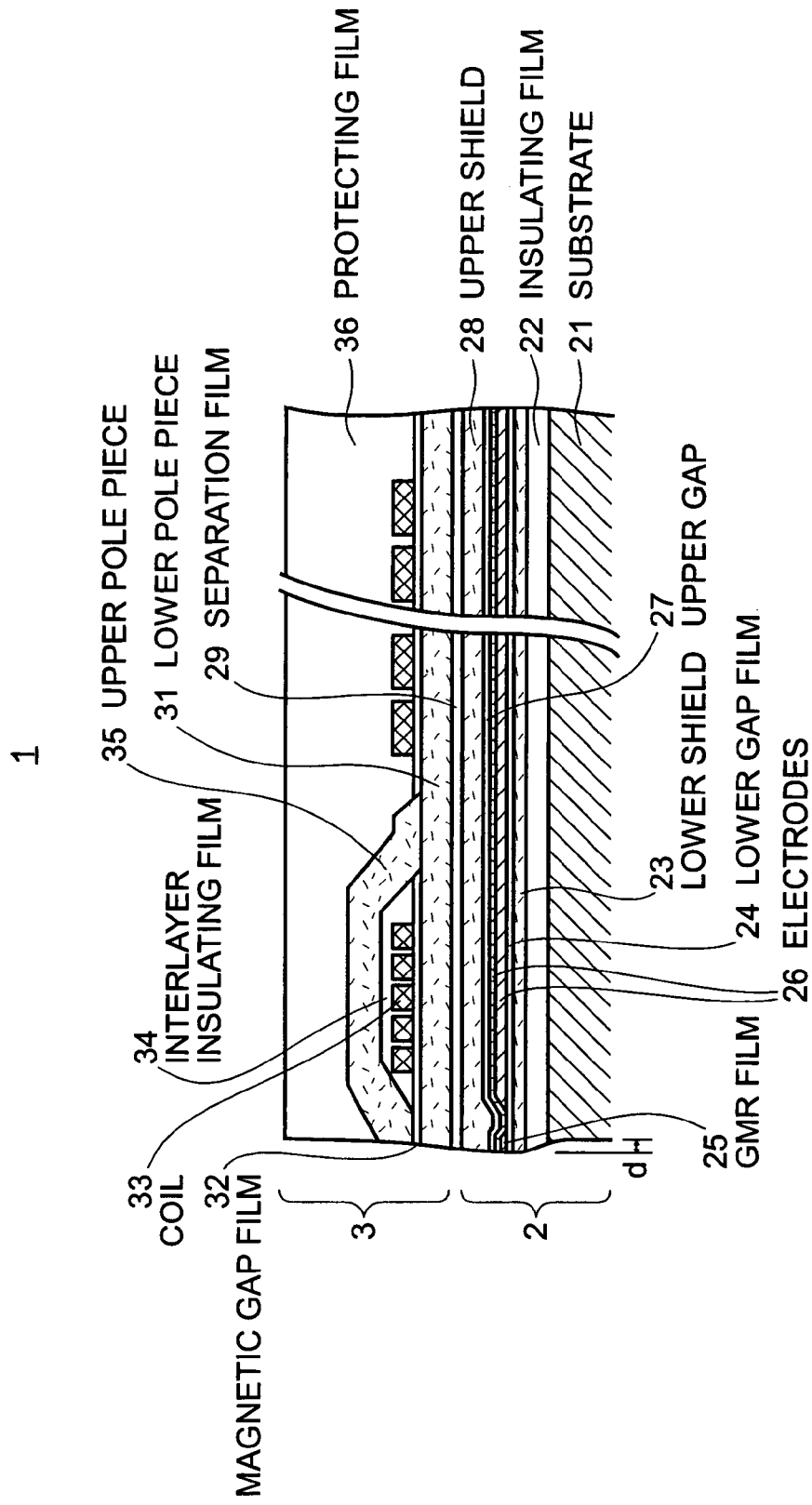
FIG. 7 is a partial cross-sectional view of a conventional separate read/write magnetic head.

Shown in FIG. 5 is an overall structure of the separate read/write magnetic head 10 of FIG. 1. The substrate 21 is bonded to an end of a slider 20 to form the GMR read head 11 and the inductive thin film magnetic write head 12 on a facet of the substrate 21. The slider 20 and the substrate 21 may be constituted of the same component.

A fabrication method of the separate read/write magnetic head 10 of the present embodiment shown in FIG. 1 is set forth in the following table, with steps labeled (1)-(8).

---

(1) The substrate 21 is prepared by baking $Al_2O_3TiC$. The insulating film 22 is formed first on the substrate 21. The insulating film 22 is an $Al_2O_3$ film formed by sputtering. A thickness of the insulating film 22 is 2 μm.

(2) A surface of the insulating film 22 is polished until the thickness is reduced to about 1 μm. Thus, $Al_2O_3$ is buried in pores of the $Al_2O_3TiC$ substrate 1 to smooth the surface thereof.

(3) The lower shield film 23 is subsequently formed on the insulating film by employing a plating method using a photoresist film as a mask. A material used for forming the lower shield film 23 is NiFe. A thickness of the film 23 is 0.7 μm.

(4) The lower gap film 24 is formed by sputtering. A thickness of the lower gap film 24 is 0.1 μm, and a material used for forming the lower gap film 24 is $Al_2O_3$. After the film 24 is formed, through holes or the like required for forming signal input and output terminals are formed. Patterning is carried out by employing an ion milling method using a photoresist film as a mask.

(5) Then, the GMR film 35 that is the most important component for signal detection is formed. The GMR film 35 is formed by sputtering. The GMR film 35 is a spin valve film having a free layer of CoFe thin film 35. After that, a patterning is carried out so that the GMR film 35 is in a predetermined shape. The ion milling method is employed also for the patterning.

(6) The electrode 26 is formed on each side of the GMR film 35 and on the lower gap film 24 by a lift off method. A material used for the electrodes 26 is Ta/TaW alloy stuck film. The thicknesses of the layers of the stuck film respectively are 3 μm and 0.01 μm.

(7) Then, the upper gap film 27 is formed from $Al_2O_3$ by sputtering. A thickness of the upper gap film 27 is 0.1 μm. After the film formation, through holes and the like are formed. A patterning is carried out by employing the ion milling method using a photoresist film as a mask.

(8) The upper shield film 28 having a thickness of 0.7 μm is formed on the upper gap film 27. The method employed in this step is the plating method using a photoresist film as a mask. A material used in this step is NiFe alloy that is used also for forming the lower shield film 23. A top face of the upper shield film 28 may preferably be leveled by polishing or the like.

---

The GMR read head 11 is formed by the steps of (1)-(8) above. A fabrication method of the inductive thin film magnetic write head 12 is set forth in the following table, with steps labeled (9)-(15).

---

(9) First, the separation film 29 for magnetically separating the inductive thin film magnetic write head 12 from the GMR read head 11 is formed by sputtering. Here, an $Al_2O_3$ thin film having a thickness of 0.5 μm is used as the separation film 29. Thus, the recording magnetic field is not applied directly to the GMR head 11, so that the electrical characteristic of the GMR head 11 is stabilized.

(10) Then, the lower pole piece 31 is formed by the plating method using a photoresist film as a mask. The main layer, which is a lower layer, is formed from a NiFe alloy, and the thin film upper layer is formed from a CoNiFe alloy that enables generation of a strong recording magnetic field. A thickness of the main layer is 1.5 μm, and a thickness of the upper layer is 0.2 μm. The air bearing surface side of the upper layer is trimmed by ion milling to achieve a width (0.3 μm) that is the same as the recording track width.

(11) Then, the magnetic gap film 32 having a thickness of about 0.1 μm is formed from an $Al_2O_3$ thin film by sputtering.

(12) Next, the coils 33 are formed in the interlayer insulating film 34. The coils 33 are formed from Cu by a plating method using a photoresist film as a mask. The number of turns of each of the two stage coils 33 is 9. The interlayer insulation film 34 is thermally stabilized by spin-applying a photoresist thereto and subjecting it to a high temperature heating so as to discharge internal gas.

(13) The upper pole piece 36 is formed from a NiFe alloy by a plating method. The upper pole tip portion 35a having a track width of 0.3 μm is formed on the upper pole piece 36 at a region facing to the medium. A material of the upper pole tip portion 35a is the CoNiFe alloy that enables generation of a strong recording magnetic field.

(14) The protection film 36 is formed on the thus-obtained stuck head element by sputtering. A thickness of the protection film 36 is 60 μm, but the thickness is reduced ultimately to 50 μm by polishing.

(15) Lastly, the terminals (not shown) for signal input and output are formed.

---

The separate read/write magnetic head 10 constituted of the GMR head 11 and the inductive magnetic thin film head 12 is formed by the steps described above. The separate read/write magnetic head 10 is less subjected to the heat deformation caused by ambient temperature rise and, therefore, it is possible to reduce the protrusion of the head element to the air bearing face caused by the heat deformation.

Shown in FIG. 6 is a magnetic disk apparatus that is provided with the separate read/write magnetic head 10. The separate read/write magnetic head 10 is supported by a gimbal 8 that is fixed to a load beam 7. The load beam 7 is attached to a carriage 4. A magnetic disk 2 is placed on a spindle 3 for rotation. The spindle 3 and the carriage 4 are mounted on a base 5. The carriage 4 is driven by an instruction from a control circuit 6 to pivotally control the load beam 7. The separate read/write magnetic head 10 fixed to the load beam 7 via the gimbal 8 is positioned on an arbitrary recording track as being moved in the radial direction of the magnetic disk 2, so that information recording or reproduction is performed.

Since the magnetic disk device is provided with the separate read/write magnetic head 10 which is formed in accordance with the embodiment of the present invention and reduced in the protrusion of the head element to the air bearing surface, the magnetic disk device is highly reliable in being capable of avoiding a collision of the separate read/write magnetic head 10 with the magnetic disk 2.

As described above, according to embodiments of the present invention, it is possible to provide a separate read/write magnetic head where protrusion of the read head element to the air bearing surface that occurs due to heat deformation caused by a change in ambient temperature is reducing.

While the above is a complete description of specific embodiments of the invention, the above description should not be taken as limiting the scope of the invention as defined by the claims.

What is claimed is:

1. A read/write separated type magnetic head comprising:
a read element having a magnetoresistive head having a magnetoresistive film disposed between a lower shield and an upper shield, both of which are formed on a substrate, and a pair of electrodes electrically connected to the magnetoresistive film; and
a write element having a coil and a magnetic gap disposed between a lower pole and an upper pole, both of the poles are disposed on the upper shield of the read element through an insulating film;
wherein the thickness of the upper shield is thinner than the thickness of the lower pole;
wherein the thickness of the lower shield is thinner than the thickness of the lower pole; and
wherein in the case of being arisen heat deformation of the read element and the write element at an air bearing surface side caused by changes in temperature, the amount of protrusion in the first area at the air bearing surface where disposed on the upper shield, the lower shield and the lower pole is less than the amount of protrusion in the second area at the air bearing surface where disposed on the upper pole.

2. A read/write separated type magnetic head comprising:
a read element having a magnetoresistive film disposed between a lower shield and an upper shield, both of which are formed on a substrate, and a pair of electrodes electrically connected to the magnetoresistive film; and
a write element having a coil and a magnetic gap disposed between a lower pole and an upper pole, both of the poles are disposed on the upper shield of the read element through an insulating film;
wherein the lower pole includes a main layer and upper layer;
wherein the thickness of the upper shield is thinner than the thickness of the lower pole at an air bearing surface side;
wherein the thickness of the lower shield is thinner than the thickness of the lower pole at the air bearing surface side; and
wherein in the case of being arisen heat deformation of the read element and the write element at the air bearing surface side caused by changes in temperature, the amount of protrusion in the first area at the air bearing surface where disposed on the upper shield, the lower shield and the lower pole is less than amount of protrusion in the second area at the air bearing surface where disposed on the upper pole.

3. A read/write separated type magnetic head comprising:
a read element having a magnetoresistive film disposed between a lower shield and an upper shield, both of which are formed on a substrate, and a pair of electrodes electrically connected to the magnetoresistive film; and
a write element having a coil and a magnetic gap disposed between a lower pole and an upper pole, both of the poles are disposed on the upper shield of the read element though an insulating film;
wherein the thickness of the upper shield is thinner than the thickness of the lower pole;
wherein the thickness of the lower shield is thinner than the thickness of the lower pole; and
wherein in the case of being arisen heat deformation of the read element and the write element at an air bearing surface side caused by changes in ambient temperature, the amount of protrusion in the first area at the air bearing surface where disposed on the upper shield, the lower shield and the lower pole is less than the amount of protrusion in the second area at the air bearing surface where disposed on the upper pole.

4. A read/write separated type magnetic head comprising:
a read element having a magnetoresistive film disposed between a lower shield and an upper shield, both of which are formed on a substrate, and a pair of electrodes electrically connected to the magnetoresistive film; and
a write element having a coil and a magnetic gap disposed between a lower pole and an upper pole, both of the poles are disposed on the upper shield of the read element through an insulating film;
wherein the lower pole includes a main layer and upper layer;
wherein the thickness of the upper shield is thinner than the thickness of the lower pole at an air bearing surface side;
wherein the thickness of the lower shield is thinner than the thickness of the lower pole at the air bearing surface side; and
wherein the in case of being arisen heat deformation of the read element and the write element at the air bearing surface side caused by changes in ambient temperature, the amount of protrusion in the first area at the air bearing surface where disposed on the upper shield, the lower shield and the lower pole is less than the amount of protrusion in the second area at the air bearing surface where disposed on the upper pole.

5. The read/write separated type magnetic head according to any of the preceding claims, wherein the thickness of each of the lower shield and the upper shield is less than 2.0 μm.

* * * * *